(12) United States Patent
Cortellazzi

(10) Patent No.: US 8,042,870 B2
(45) Date of Patent: Oct. 25, 2011

(54) DEVICE FOR ATTACHING MOTOR VEHICLE SEAT COVERS OR MATS

(76) Inventor: Giovanni Cortellazzi, Colorno (FR)

( * ) Notice: Subject to any disclaimer, the term of this patent is extended or adjusted under 35 U.S.C. 154(b) by 418 days.

(21) Appl. No.: 12/305,608

(22) PCT Filed: Jun. 15, 2007

(86) PCT No.: PCT/EP2007/005293
§ 371 (c)(1), (2), (4) Date: Dec. 18, 2008

(87) PCT Pub. No.: WO2007/147523
PCT Pub. Date: Dec. 27, 2007

(65) Prior Publication Data
US 2009/0174249 A1   Jul. 9, 2009

(30) Foreign Application Priority Data
Jun. 19, 2006 (IT) .............................. PR2006A0055

(51) Int. Cl.
*A47C 31/00* (2006.01)
(52) U.S. Cl. ................................ 297/228.12; 297/219.1
(58) Field of Classification Search .............. 297/219.1, 297/228.11, 228.12, 229, 188.06, 254
See application file for complete search history.

(56) References Cited

U.S. PATENT DOCUMENTS

| | | | | |
|---|---|---|---|---|
| 1,051,566 A | * | 1/1913 | Dreher | 297/226 |
| 3,144,273 A | * | 8/1964 | Blackburn et al. | 297/254 |
| 4,723,814 A | * | 2/1988 | Hunt | 297/219.1 |
| 5,302,001 A | * | 4/1994 | van Dis | 297/228.13 |
| 5,320,407 A | * | 6/1994 | Tell | 297/228.11 |
| 6,655,736 B1 | * | 12/2003 | Arenas | 297/229 |
| 6,659,551 B1 | * | 12/2003 | Arenas | 297/229 |
| 7,607,732 B2 | * | 10/2009 | Beroth et al. | 297/229 |
| 2004/0212230 A1 | * | 10/2004 | Hanks | 297/229 |
| 2009/0028466 A1 | * | 1/2009 | Bailey | 383/4 |
| 2009/0091165 A1 | * | 4/2009 | Thompson | 297/228.12 |
| 2010/0001565 A1 | * | 1/2010 | Gray et al. | 297/229 |
| 2010/0007185 A1 | * | 1/2010 | Beroth et al. | 297/229 |

FOREIGN PATENT DOCUMENTS

| | | | |
|---|---|---|---|
| DE | 4238363 A1 | * | 5/1993 |
| FR | 2 714 636 | | 7/1995 |
| WO | 2004/028853 | | 4/2004 |

OTHER PUBLICATIONS

International Search Report dated Nov. 2, 2007, from corresponding PCT application.

* cited by examiner

*Primary Examiner* — David Dunn
*Assistant Examiner* — David E Allred
(74) *Attorney, Agent, or Firm* — Young & Thompson

(57) ABSTRACT

A device for fixing a car seat mat or cover to the backrest part, which is composed of a hollow tubular member (4) of 'open' circular section, having at least two slots (5) formed at a certain distance from the axis of such tubular member (4). Two enlarged parts (11) with a thread (10) integrated, inserted or threaded therein are received in each of the slots (5) to form a loop that closes upon the tubular member: one of the headrest rods will pass through the loop. A second device (20) for holding the car seat cover or mat fixed to the seating surface of the seat namely attachment thereof to the seating surface of the car seat uses a pair of such devices (20) with respective ropes (C), which are hooked and fastened together.

6 Claims, 5 Drawing Sheets

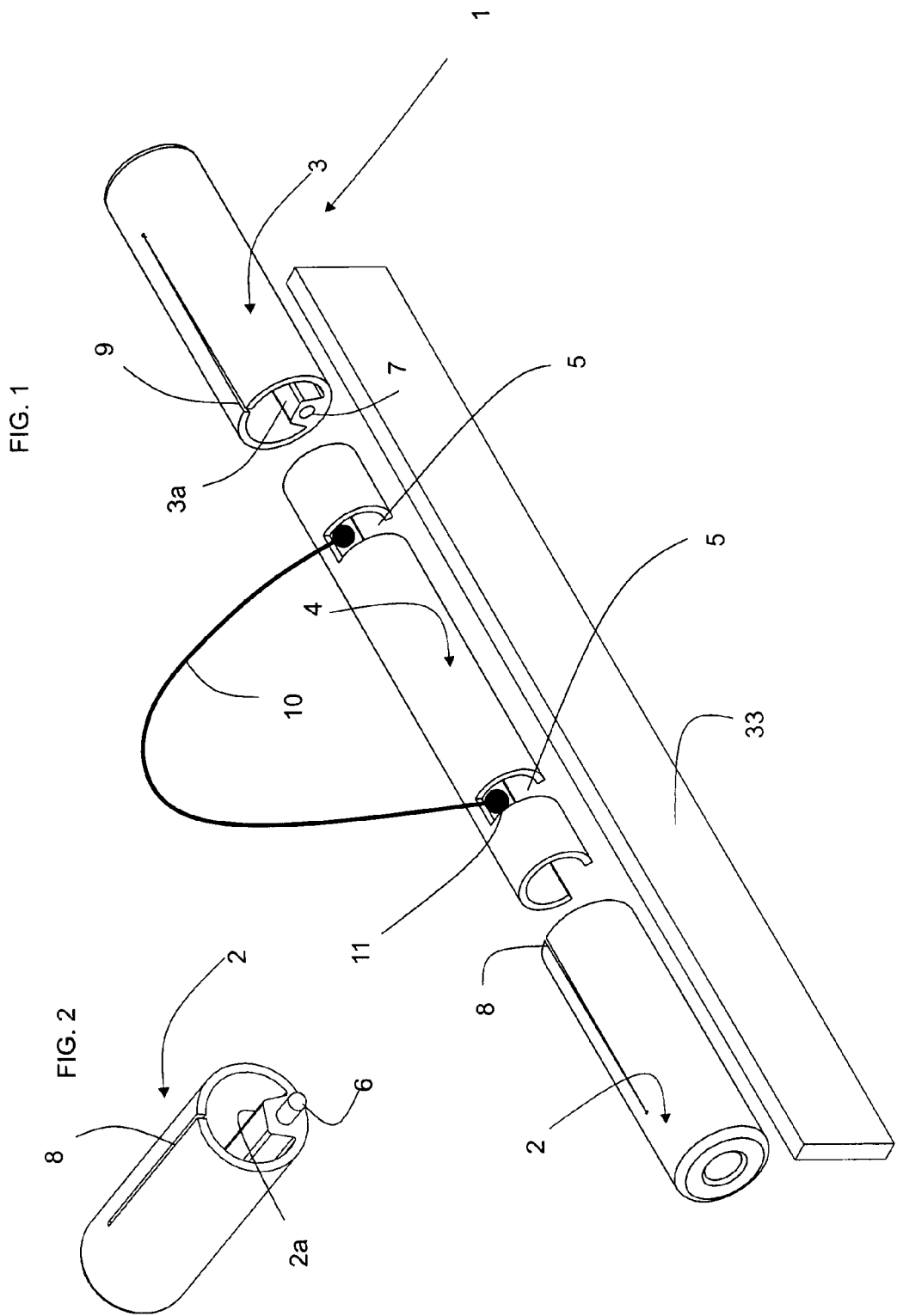

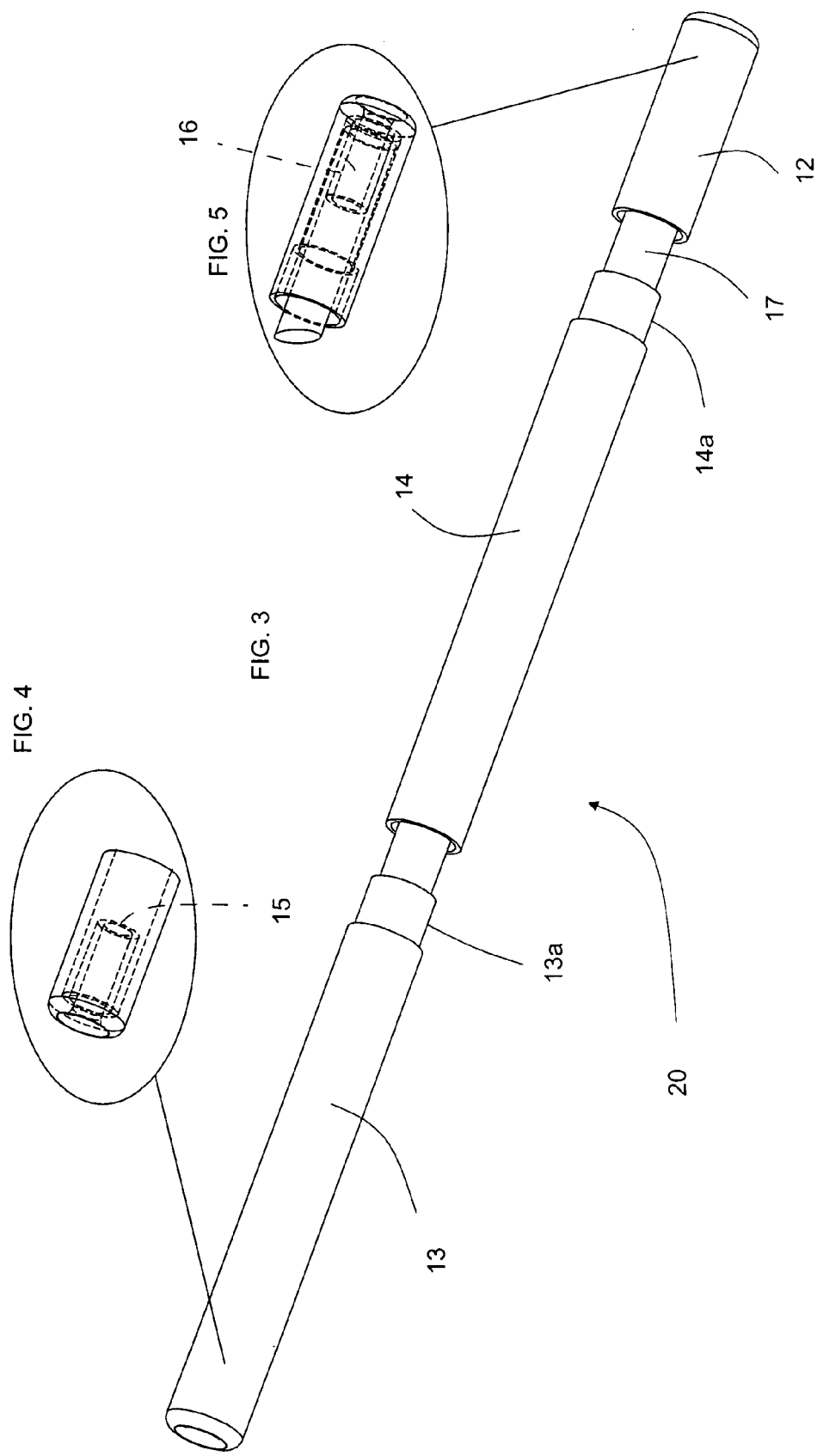

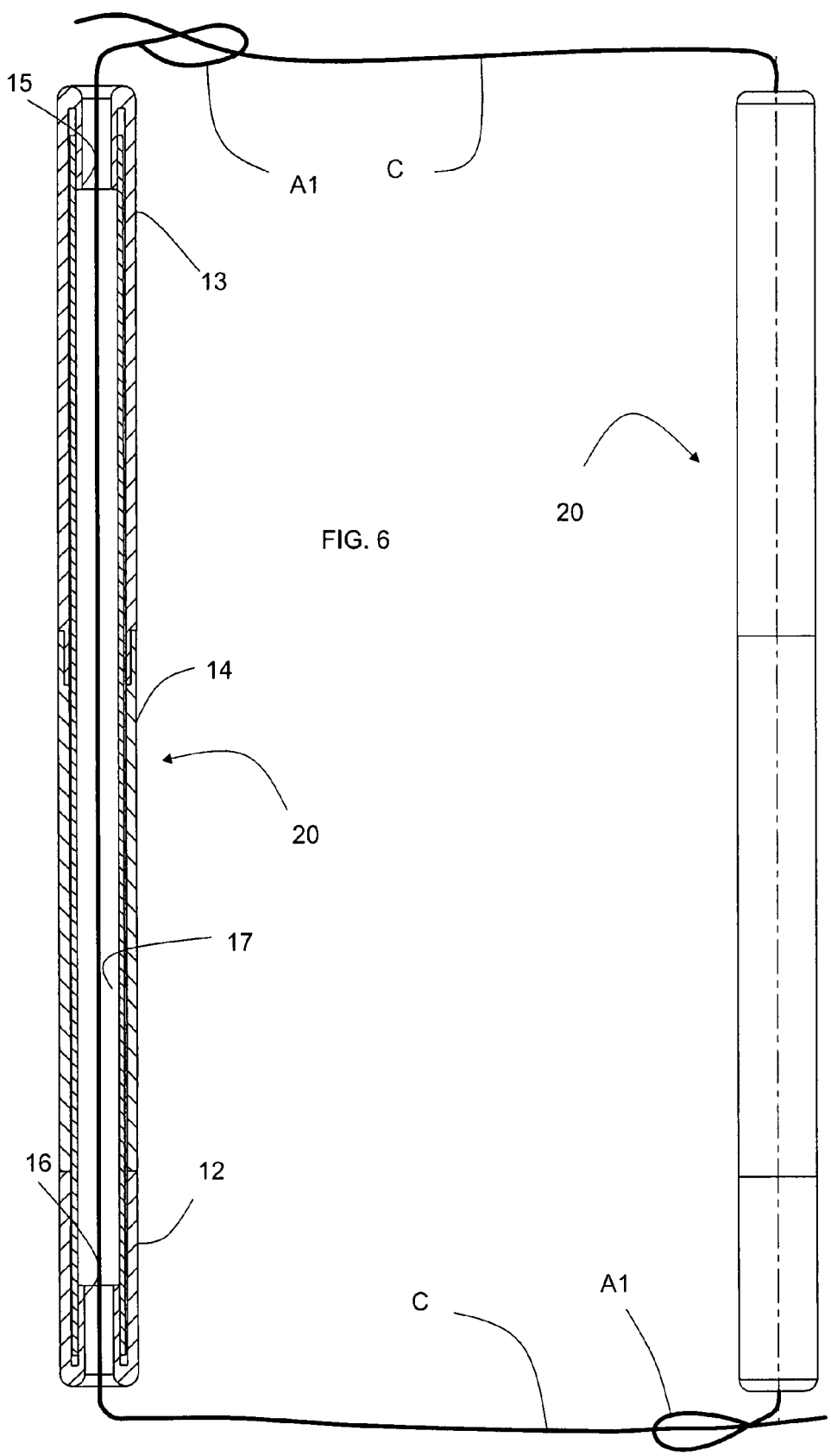

DEVICE FOR ATTACHING MOTOR VEHICLE SEAT COVERS OR MATS

The present invention relates to a device for attaching motor vehicle or vehicle seat covers or mats and particularly, in a first embodiment, to a device for stabilizing and fixing them to the backrest part and, in a second embodiment, for fixing them to the seating surface of the front and/or rear seat of the motor vehicle.

In prior art, a number of hook-like retainers are provided, which have to be hooked either to some location under the seat body or together; bands, possibly of elastic material, are provided for this purpose.

Elastic bands to be tied together are also used for attachment to the backrest.

The drawbacks of prior art are mainly related to the failure to hold the seat cover in a stable position, and to allow undesired lateral displacements and puckering.

Elastic bands lose their elasticity with time and under heat and no adequate stretching of the seat cover can be achieved.

The object of this invention is to provide a device for stable fixation of a seat cover both to the backrest and to the seating surface of a motor vehicle seat, as disclosed and claimed hereinbelow.

The device achieves the following advantages:
easy and fast mounting;
stable position of the seat covers, with no undesirable puckering that might induce wrong driving postures.

These objects and advantages are achieved by the device for attaching car seat covers or mats according to this invention, which is characterized as defined in the annexed claims.

These and other features will be more apparent from the following description of a few embodiments, which are shown by way of example and without limitation in the accompanying drawings, in which:

FIG. 1 is a perspective view of a part of the device showing the fixation of the seat cover to the upper part of the backrest;

FIG. 2 is another perspective view of a detail of FIG. 1;

FIG. 3 is a perspective view of a second part of the device for fixing the seat cover to the junction area between the seating surface and the backrest and the front portion of the seat;

FIGS. 4 and 5 show details of FIG. 3;

FIG. 6 is a plan view of a system for fixing the two second device parts;

Figure 7:
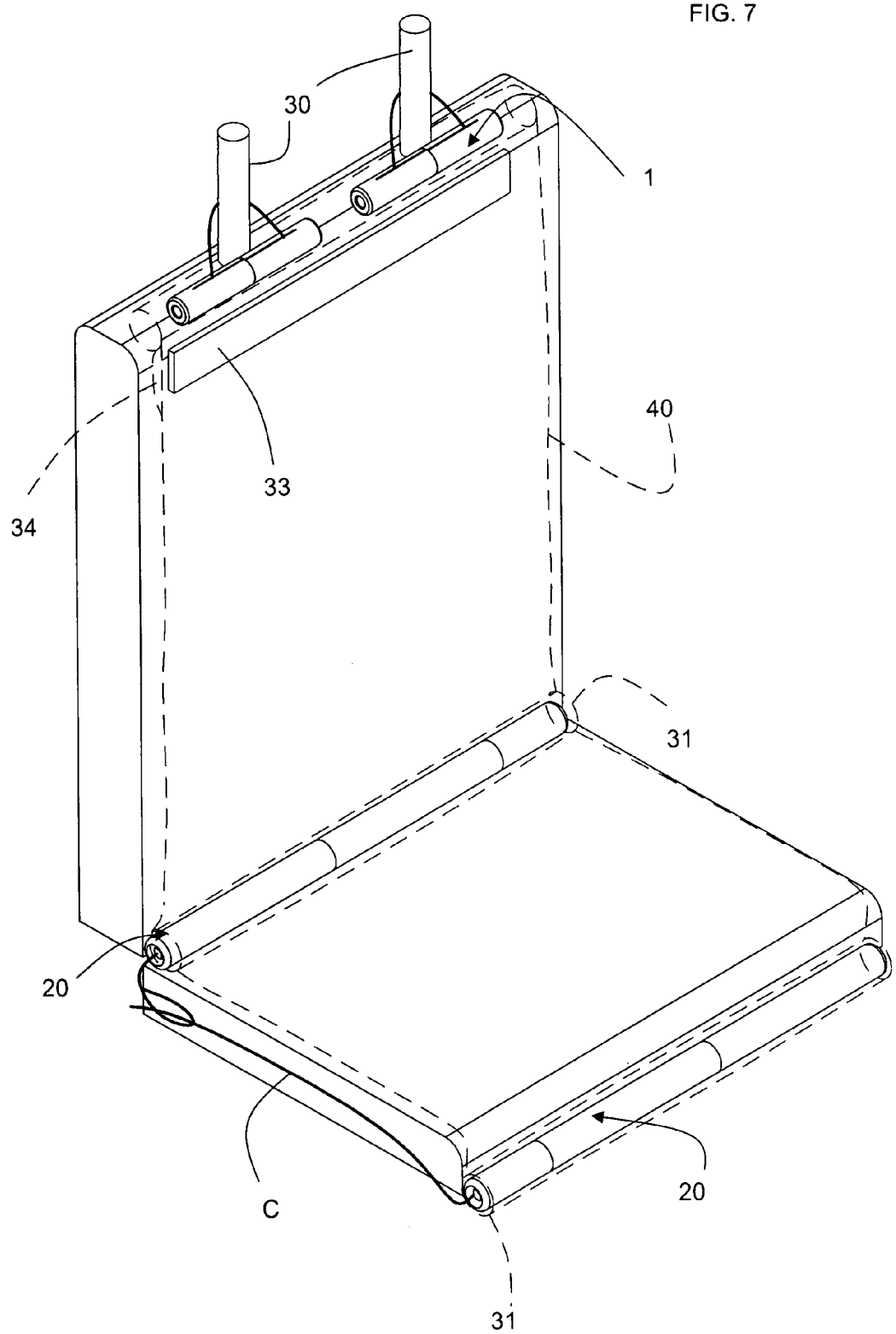
FIG. 7 is a perspective view of a seat with a seat cover thereon, and the fixation device applied to said seat cover.

Referring to FIG. 1, a first embodiment of the inventive device is shown; particularly, numeral 1 generally designates a device for fixing a motor vehicle seat mat or cover 40 to the backrest part 39, which part will be supported by the rods 30 of the headrests (not shown).

The device 1 is composed of a hollow tubular member 4 of "open" circular section, having at least two slots 5 formed at a certain distance from the axis of such tubular member 4.

Two enlarged parts 11 with a thread or thin rope 10 integrated, inserted or threaded therein are received in each of said slots 5 to form a loop that closes upon the tubular member: said loop will encircle one of the headrest rods 30.

The tubular member 4 with the thread or rope 10 so inserted therein will be closed by two caps 2 and 3 sliding in the direction of the axis of the tubular member 4 and designed for male 6 and female 7 connection, such as a pin and hole connection, these connections being formed on an inner protrusion 2a, 3a of the corresponding means.

A slot 8, 9 is formed on the casing of each of these caps 2 and 3, for connection with the thread 10 inserted in the tubular member.

Preferably, the enlarged portions of the thread or rope are larger than the apertures 5; thus, the thread 10 may be inserted therein by opening the section of the tubular member 4.

The above is the simplest way to form the loop with the thread 10 and the tubular member 4, although it is understood that any equivalent solution, with or without slots 5, will be susceptible to the requested protection, and involves no departure from the inventive scope.

According to the illustrated embodiment, the device 1 has a loop for each headrest rod; in a first variant embodiment, not shown, a single longer tubular member 4 may be provided, having at least four slots 5 coinciding with the center-to-center distances of two headrests and two corresponding threads or ropes 10 to encircle both headrest rods with a single tubular member; the caps will obviously be of greater length and designed for mutual connection.

According to a further variant embodiment, not shown, the tubular member 4 may have multiple spaced slots 5 for each supported thread or rope 10, to allow adjustment of the loop and to encircle the rods of different models, at different distances from the seat.

The device 1 will be thus connected to the backrest of the seat cover by annular ribbons, which are bonded or sewn on the edge of the latter.

A second device 20 is shown in FIGS. 3, 4, 5 and 6 and relates to a device for holding the car seat cover or mat fixed to the seating surface 38 of the seat namely attachment thereof to the seating surface of the car seat uses a pair of such devices 20 with respective ropes or braids (C), which are hooked and fastened together as set forth below.

The device 20 is composed of one or more hollow tubulars 17 of circular section, with a number of elements 12, 13 and 14 thereon, two of which, in this example those designated by numerals 13 and 14 are conformed with protuberances and/or threads 13a and 14a for connection and/or mating with the elements adjacent thereto, in this example those designated by numerals 12 and 14.

The device 20 can be composed of one or more hollow tubulars 17 or of a whole formed by one or more hollow tubulars 17 and the elements 12, 13 and 14.

Two internal recesses 15 and 16 are visible in the end elements 12 and 13, which have such a size as to form an annular cavity which is as thick as or slightly thicker than the tubular 17 and thereby maintains it in its inserted position.

The rope C or braid inserted in said one or more hollow tubulars 17 and coming out of it at both ends, forms an eyelet A1 at one end, with the other end being free: when two devices 20 are substantially parallel between the seat and the plastic body, an eyelet A1 of the first rope C will encounter the rope end of the other device 20 ad vice versa for mutual connection.

Otherwise, one of the devices 20 will have a rope with eyelets A1 at both ends and the other will have a rope with both simple ends.

In the case in which C is a braid, it will be possible to realize the eyelets A1 inserting the end of the braid, namely its free end, into the longitudinal internal cavity (along the axis of the braid) which is created as a result of a compression action of a preceding segment of the braid; the end so inserted will come out after a certain length from the opposite side.

Namely, the device 20 will be fitted in the seat mat or cover, that will have appropriately sized and spaced compartments 31, formed of fabric or plasticized fabric, and applied by transverse seams: Each seat will be equipped with two devices, mutually connected by their respective ropes, which will attach and stretch the seat cover and keep it stretched.

Especially but without limitation, multiple compartments 31 may be provided at the junction area between the seat and the backrest, for better adaptation to the sizes thereof.

While specific reference has been made herein to two devices 1 and 20 of circular section, such devices may obviously have any section, such as elliptical, quadrangular or other shapes; in this case, the cover elements 2, 3, 12, 13, 14 will also have a different shape, adapted to cover such means.

The rope C or braid may be formed of metal, vegetable, synthetic or artificial materials.

The device 20 may have any length, and the cap elements 12, 13 and 14 may be provided in any combination, possibly with the addition of intervening elements 14.

Both device 1 and the device 20 may be used alone.

For improved stretching of the upper portion of the seat cover in the area for attachment thereof to the headrest rods 30, a slat 33 of semirigid material is provided, to be inserted in a compartment 34 opened on one side, said compartment 34 being formed by transverse seams.

The compartments 31 and 34 may be formed in various manners, such as by thermo-stamping (welding and blanking machines) and may be also covered or protected by metal eyelet, which are not part of the inventive scope.

Figure 8:
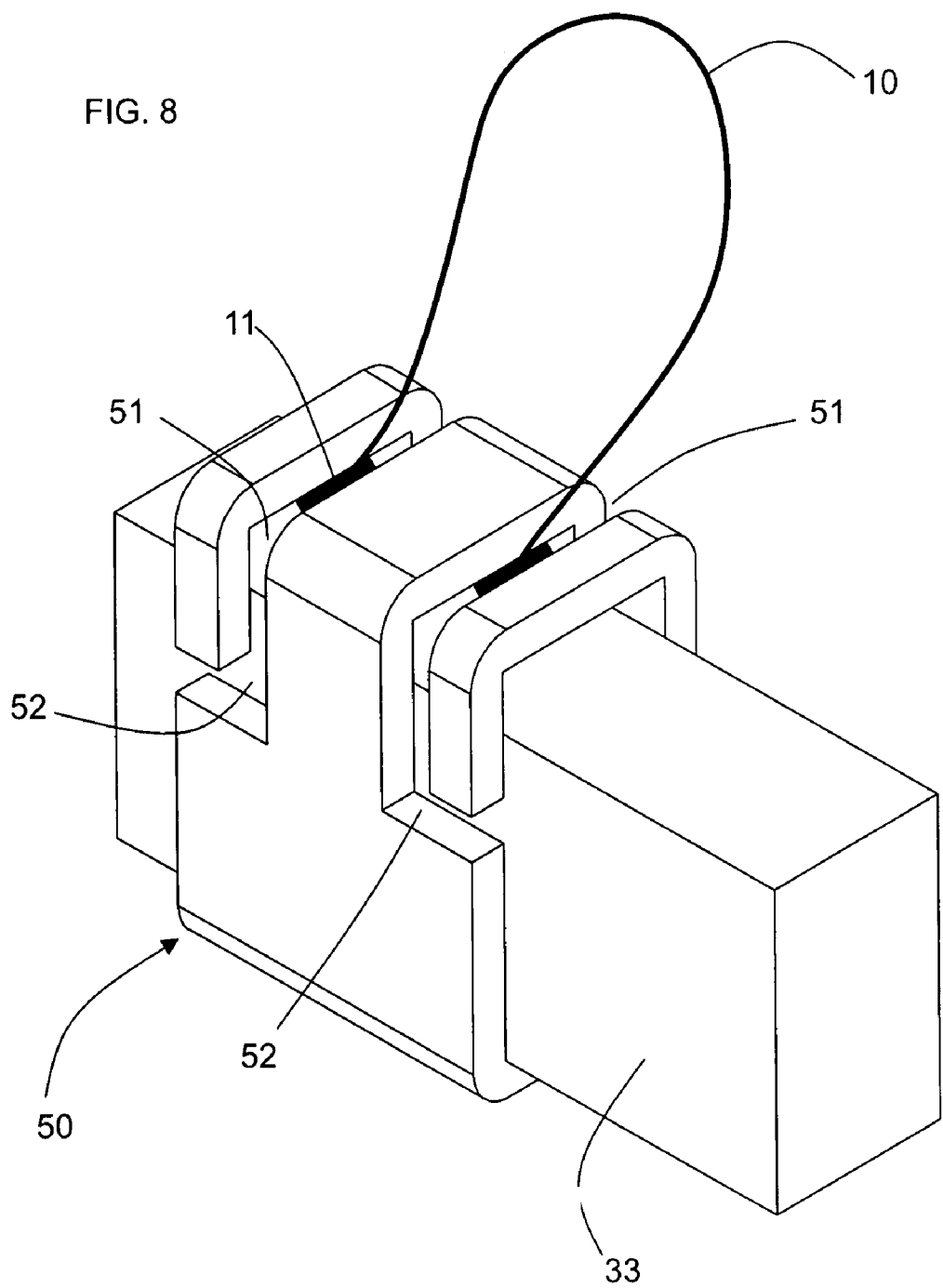
FIG. 8 is a perspective view of the device according to a possible embodiment.

A possible variant will be now described with reference to FIG. 8, where a tubular member portion 50 of rectangular section is provided, having two slots 51 on its top face, which terminate into further slots 52 perpendicular to the former, for the two slots 51 to communicate with the outside to allow the passage of the thread 10 carrying the enlarged parts 11. The slat 33 of semirigid material, which was an external element in the above embodiment, may be advantageously inserted in the tubular member portion. Obviously, the tubular member portion 50 may have any desired section, with the section of the slat 33 being adapted to the internal section of said tubular member.

The invention claimed is:

1. A car seat cover fastening device (1) for fixing a motor vehicle seat cover to a backrest part of a car seat, characterized in that the car seat cover fastening device comprises: a. a hollow tubular member (4), having at least two slots (5) formed at a certain distance from an axis of said tubular member (4), b. two enlarged parts (11) at respective ends of a rope (10), wherein one of the enlarged parts (11) is received in each of said slots (5) to form a loop that closes upon the tubular member (4) and at least one headrest rod that passes through said loop, c. two caps (2) and (3) engaged on the hollow tubular member and slidably connected to each other in a direction of the axis of the tubular member (4).

2. A device (1) as claimed in claim 1, characterized in that a slot (8 and 9) is formed on a casing of each cap (2 and 3), for connection with the rope (10) inserted in the tubular member (4).

3. A device (1) as claimed in claim 1, characterized in that the hollow tubular member comprises a circular, quadrangular or elliptical section.

4. A device (1) as claimed in claim 1, characterized in that the connection of the caps (3, 4) comprises a male and a female connection.

5. A device (1) as claimed in claim 1, characterized in that said enlarged parts (11) of the rope (10) are larger than the slots (5).

6. A device (1) as claimed in claim 1, characterized in that the device has multiple slots (5) for adjusting the position of the rope (10).

\* \* \* \* \*